United States Patent
Venkatesan et al.

(10) Patent No.: US 7,681,190 B2
(45) Date of Patent: *Mar. 16, 2010

(54) MINIMUM DELTA GENERATOR FOR PROGRAM BINARIES

(75) Inventors: Ramarathnam Venkatesan, Redmond, WA (US); Saurabh Sinha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1036 days.

This patent is subject to a terminal disclaimer.

(21) Appl. No.: 11/276,814

(22) Filed: Mar. 15, 2006

(65) Prior Publication Data

US 2006/0145895 A1 Jul. 6, 2006

Related U.S. Application Data

(63) Continuation of application No. 09/713,633, filed on Nov. 14, 2000, now Pat. No. 7,058,941.

(51) Int. Cl.
*G06F 9/44* (2006.01)
(52) U.S. Cl. .................. 717/168; 717/132; 717/144; 717/156
(58) Field of Classification Search .................. None
See application file for complete search history.

(56) References Cited

U.S. PATENT DOCUMENTS 5,379,422 A 1/1995 Antoshenkov (Continued)

FOREIGN PATENT DOCUMENTS

JP 63208941 8/1988

(Continued)

OTHER PUBLICATIONS

Burns, "Differential Compression: a Generalized Solution for Binary Files—Thesis" Dec. 1996.

(Continued)

*Primary Examiner*—Michael J Yigdall
(74) *Attorney, Agent, or Firm*—Lee & Hayes, PLLC

(57) ABSTRACT

Implementations provide a technology for generating a minimum delta between at least two program binaries. An implementation is given a source program (S) in a binary format and a target program (T) in a binary form. It constructs control flow graphs (CFGs) of each. It matches common blocks of the S's CFGs and T's CFGs. The blocks are matched based upon their content and their local neighborhoods. In addition, the register renaming problems is solved so that blocks can be fairly compared. This implementation produces an intermediate output, which is the content of unmatched blocks. It generates a set of edge edit operations for merging the unmatched blocks into S. The combination of the unmatched blocks and the edit operations is the delta. To patch S to produce a reconstructed copy of T, the delta is merged with S.

6 Claims, 8 Drawing Sheets

U.S. PATENT DOCUMENTS

| | | | |
|---|---|---|---|
| 5,481,722 | A | 1/1996 | Skinner |
| 5,630,138 | A | 5/1997 | Raman et al. |
| 5,710,916 | A | 1/1998 | Barbara et al. |
| 5,774,730 | A | 6/1998 | Aizikowitz et al. |
| 5,974,254 | A | 10/1999 | Hsu |
| 6,018,747 | A | 1/2000 | Burns et al. |
| 6,189,116 | B1 | 2/2001 | Mongan et al. |
| 6,205,444 | B1 | 3/2001 | Floratos et al. |
| 6,314,562 | B1 | 11/2001 | Biggerstaff |
| 6,526,574 | B1 | 2/2003 | Jones |
| 6,594,822 | B1 | 7/2003 | Schweitz et al. |
| 6,860,422 | B2 | 3/2005 | Hull et al. |
| 7,058,941 | B1 | 6/2006 | Venkatesan et al. |
| 2003/0084424 | A1 | 5/2003 | Reddy et al. |
| 2004/0268219 | A1 | 12/2004 | Brown et al. |
| 2006/0200796 | A1 | 9/2006 | Ota et al. |

FOREIGN PATENT DOCUMENTS

| | | |
|---|---|---|
| JP | 9016389 | 1/1997 |
| JP | 2002169702 | 6/2002 |
| WO | WO99/04336 | 1/1999 |
| WO | WO0011549 | 3/2000 |

OTHER PUBLICATIONS

Chipman, Laure J., "A graph theoretic approach to scene matching," The University of Alabama in Huntsville, 1990.

Coppieters, "A Cross-Platform Binary Diff," Dr. Dobbs Journal, Redwood City CA US, May 1, 1995, pp. 3235-3236.

Horwitz, Susan et al. "Efficient comparison of program slices" Acta Informatica v. 28 n 8, 1991, pp. 713-732.

Horwitz, Susan, "Identifying the Semantic and Textual Differences Between Two Versions of a Program" Proceedings of the ACM Sigplan 1990 Conf. on the Programming Language Design and Implementation, White Plains NY, Jun. 20, 1990, pp. 234-245.

Maruyama, Katsuhisa, et al., "A Mechanism for Automatically and Dynamically Changing Software Components," NTT Software Libraries, 1997.

Tridgell A, "Efficient Algorithms for Sorting and Synchronization—Thesis" Apr. 2000, Thesis submitted for the Degree of Doctor of Philosophy at The Australian National University, pages complete 113.

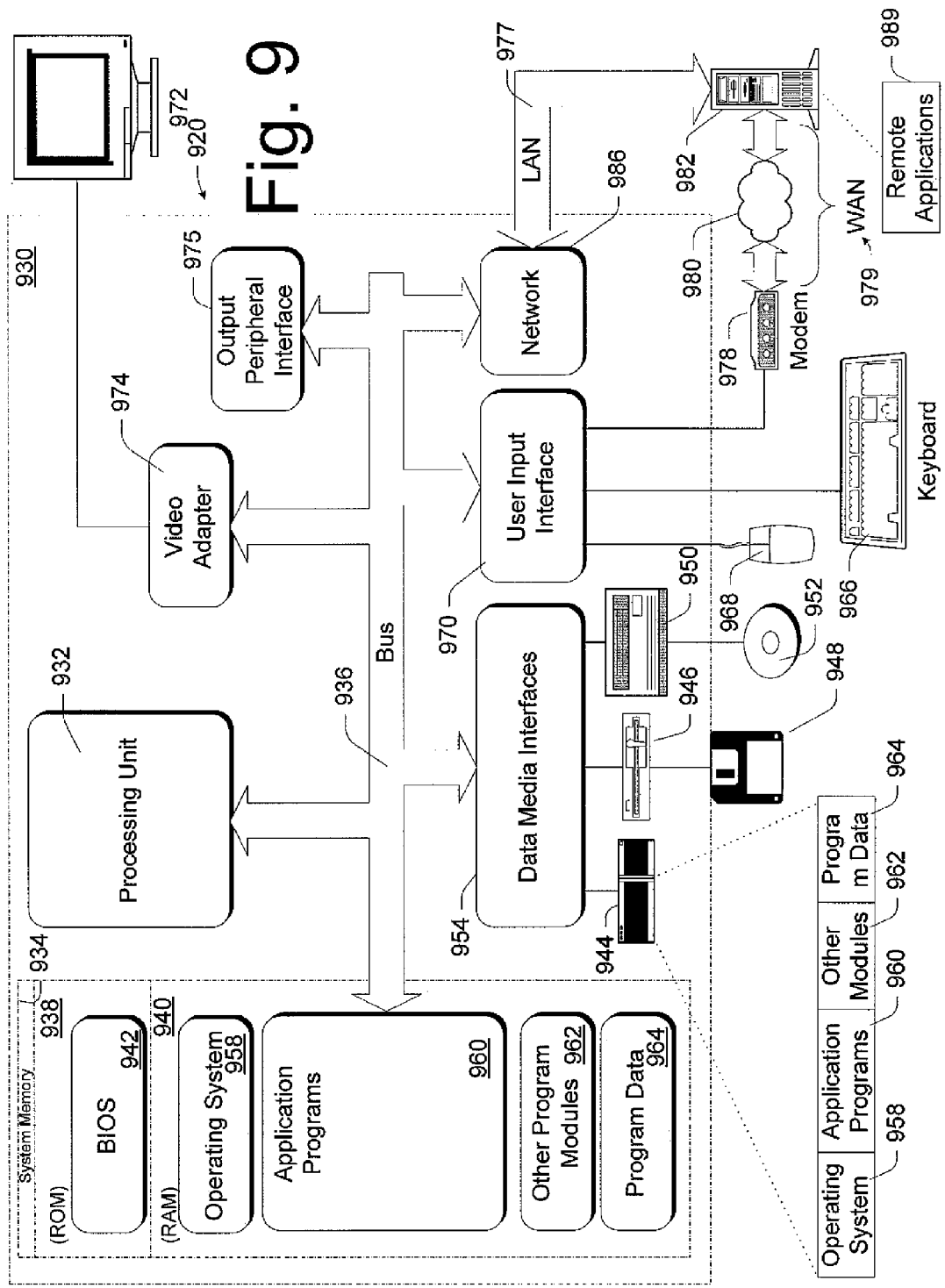

MINIMUM DELTA GENERATOR FOR PROGRAM BINARIES

RELATED APPLICATIONS

This application is a continuation of and claims priority to U.S. patent application Ser. No. 09/713,633, filed on Nov. 14, 2000, the disclosure of which is incorporated by reference.

BACKGROUND

One of the important characteristics of modern software systems is its ability to be upgraded, which may be called "upgradability." Old software is continuously being replaced by newer versions, and code reusability and modular development are major features of software design.

Accuracy

When software is upgraded from an old version to a new version, complete accuracy is vital. Every bit in the newly upgraded software in the target computer must match exactly with the new software from at its media source. Otherwise, the new software may operate incorrectly or not at all.

To assure complete accuracy, conventional techniques completely replace the old software with the new software. As software programs (in particular major application suites and operating systems) grow in size and complexity, this whole-sale replacement-to-update scheme becomes more time consuming and frustrating to the customer of such software.

Aggravating matters is a trend to move the source of such updates from local, portable, high-bandwidth removable media (such as a CD-ROM) to remote, centralized, relatively low-bandwidth network servers (such as Internet web servers). While replacing a 100 MB of software may be from a CD-ROM may take several minutes, replacing the same amount of software over a dial-up Internet connection may take several hours.

Herein, "complete accuracy" and "substantially identical" allows for minor and insubstantial differences between the new software as originally produced and the new software as it exists on a user's computer.

Conventional Delta-Patching

Typically, newer versions of software have a few additional portions, as well as some minor changes in older portions. Therefore, the brute force approach of completely replacing the old with the new is overkill. An alternative is to capture these changes into a "patch" so that one can reconstruct the newer version from the older one. Because there are differences between the old and new versions, this technique is sometimes called "diff-patching." Herein, the differences between the old and new versions are called the "delta" (Δ), thus this diff-patching technique may be called "delta-patching" (or "Δ-patching").

The problem with delta-patching is accuracy. Identifying what is and is not 1B patched is difficult. If the boundaries of such a patch are not accurately determined, the patched version will be different from the desired new version of the software.

As a result, conventional delta-patching compromises efficiency to achieve accuracy. Generally, the sub-module files, data files, library files, and groups of such files are marked if there is any change whatsoever within them. This means, for example, if one line of source code is changed within a 100 Kb DLL (dynamic link library) file is changed, the entire DLL file is replaced. This is done rather than replacing the fragment in the existing DLL file in part because of the difficulty in selecting the fragment that needs replacing and replacing only that with complete accuracy. However, it is most done because replacing the entire module is more efficient with conventional techniques. A small change in one little fragment might appear to be a change spread all over the entire program.

Although this conventional inefficient delta-patching is more efficient and faster than wholesale replacement of the entire software, it still is not as efficiency as possible. It would be more efficient to patch only those fragments of modules and sub-modules that are different from or non-existent in the old software version. Examples of fragments include subroutines, functions, objects, data structures, interfaces, methods, or portions of any of these.

Invariant Fragment Detection

A prerequisite for detecting fragment deltas is the ability to detect invariance of fragments. In other words, before a program module can be patched, one needs to determine which fragments have not been changed across the two versions. With knowledge of the source code for each version, detecting such invariants and creating a patch is not very difficult.

However, detecting invariance of fragments becomes much more difficult when dealing with binary manifestations of such fragments (with no knowledge of the source code). A major difficulty is the existence of functionally unchanged code that appears different in the differing versions of a program module. Code may undergo no change in its functionality, but it may look different in the two versions due to a variety of reasons. Examples of such reasons include:

Changes in one region of code can cause another (unchanged) region to look different Two small sequences of binary code may look identical even if they correspond to source code with different functionality Differences in the register allocation in the two builds Change Begets Apparent Change Often small changes in one portion of the code cause a cascade of changes in nearby and sometimes even far-off regions of code. Consider, for example, the following two source fragments:

| Program P1 | Program P2 |
|---|---|
| function f(int p) | function g(int p) |
| int a=3, b=4; | int b=4, a=3; |
| if (b > p) { | if (b > p) { |
| a = p; | a = p |
| return a; | return a; |

The two functions f and g, located in the two programs P1 and P2, are really the same, apart from a difference of names. Clearly, knowledge of the source code would establish that the "if (b>p)" conditional in each fragment is the same, and need not be patched. However, if their corresponding binaries are examined, the offset of b from the base of the stack would be different in these two fragments. This is because of the declaration of a before b in P1 differs in form from the declaration of b before a in P2. Hence, the binaries of the two fragments will not be identical, even if everything else was the same. Of course, these differences in form are irrelevant in substance, but their resulting binaries are different nevertheless.

Now consider the following snippets:

| Program P1 | Program P2 |
|---|---|
| x = f(10) | x = g(10) |

Assume, for this example, that the functions f and g are defined as in the previous example. Here again, the two calls are identical, because the functions being called as well as the call arguments are identical. However, if the identity of f and g is not known, then the identity of the calls above will also not be discovered. This is an example of how local changes can cascade through potentially far-off regions of code.

Appear Identical, but Are Not

At times, two binary fragments may look identical even though they correspond to different regions in the structure of the corresponding programs. Consider the following:

| Program P1 | Program P2 |
|---|---|
| int a = atoi(argv[1]);<br>int b = atoi(argv[2]);<br>if (a < 10) return;<br>if (b < 20) return;<br>... | int b = atoi(argv[2]);<br>if (b < 10) return;<br>... |

The conditionals "if (a<10)" in P1 and "if (b<10)" in P2 might both translate to the same binary code, even though their functionality is different (as is seen clearly by examining their source code). This happens because the offset of b on the stack in P2 may be the same as that of a on the stack of P1. The two variables are clearly different, being defined by different program arguments, as can be see in the context above them. However, comparing their binary equivalents without reference to the source code context above can give the illusion of an identity. A representation of the binary equivalent might look something like:

```
mov eax, dword ptr[ebp + 8h]
cmp eax, 0ah
jge L
ret
L: ...
```

Register Allocation

Another problem in detecting identity of binary fragment is caused by register allocation. A change in a portion of code may cause the register allocation to change in nearby regions, even though these latter regions have not been modified. Therefore, when comparing binaries, one has to consider the possibility that what looks like a change of register operands may in fact be an identity disguised by a simple renaming of registers.

SUMMARY

Described herein is a technology for generating a minimum delta between at least two program binaries. An implementation, described herein, is given a source program (S) in a binary format and a target program (T) in a binary form. It constructs control flow graphs (CFGs) of each. It matches common blocks of the S's CFGs and T's CFGs. The blocks are matched based upon their content and their local neighborhoods (e.g., d-neighborhoods). In addition, blocks are matched using labels, which are based upon computed hash values. The matching is done in multiple passes where each pass improves the matching by relaxing the criteria for a match. In addition, the register renaming problems is solved so that blocks can be fairly compared.

This described implementation produces an intermediate output, which is the content of unmatched blocks. Such unmatched blocks are those found in T that are not found in S. It generates a set of edge edit operations for merging the unmatched blocks into S. The combination of the unmatched blocks and the edit operations is the delta. To patch S to produce a reconstructed copy of T, the delta is merged with S.

BRIEF DESCRIPTION OF THE DRAWINGS

The same numbers are used throughout the drawings to reference like elements and features.

FIG. 9 is an example of a computing operating environment capable of implementing an implementation of a minimum delta generator for program binaries.

DETAILED DESCRIPTION

The following description sets forth specific embodiments of a minimum delta generator for program binaries that incorporate elements recited in the appended claims. These embodiments are described with specificity in order to meet statutory written description, enablement, and best-mode requirements. However, the description itself is not intended to limit the scope of this patent.

Described herein are one or more exemplary implementations of a minimum delta generator for program binaries. The inventors intend these exemplary implementations to be examples. The inventors do not intend these exemplary implementations to limit the scope of the claimed embodiments. Rather, the inventors have contemplated that the claimed embodiments might also be embodied and implemented in other ways, in conjunction with other present or future technologies.

Incorporation by Reference

The following co-pending patent applications, which were all filed Jun. 30, 1999 and assigned to the Microsoft Corporation, are incorporated by reference herein:

U.S. patent application Ser. No. 09/343,805 entitled "Translation and Transformation of Heterogeneous Programs";

U.S. patent application Ser. No. 09/343,298 entitled "Instrumentation and Optimization Tools for Heterogeneous Programs";

U.S. patent application Ser. No. 09/343,279 entitled "Shared Library Optimization for Heterogeneous Programs";

U.S. patent application Ser. No. 09/343,276 entitled "Application Program Interface for Transforming Heterogeneous Programs"; and U.S. patent application Ser. No. 09/343,287 entitled "Cross Module Representation of Heterogeneous Programs".

Brief Overview

Figure 1:
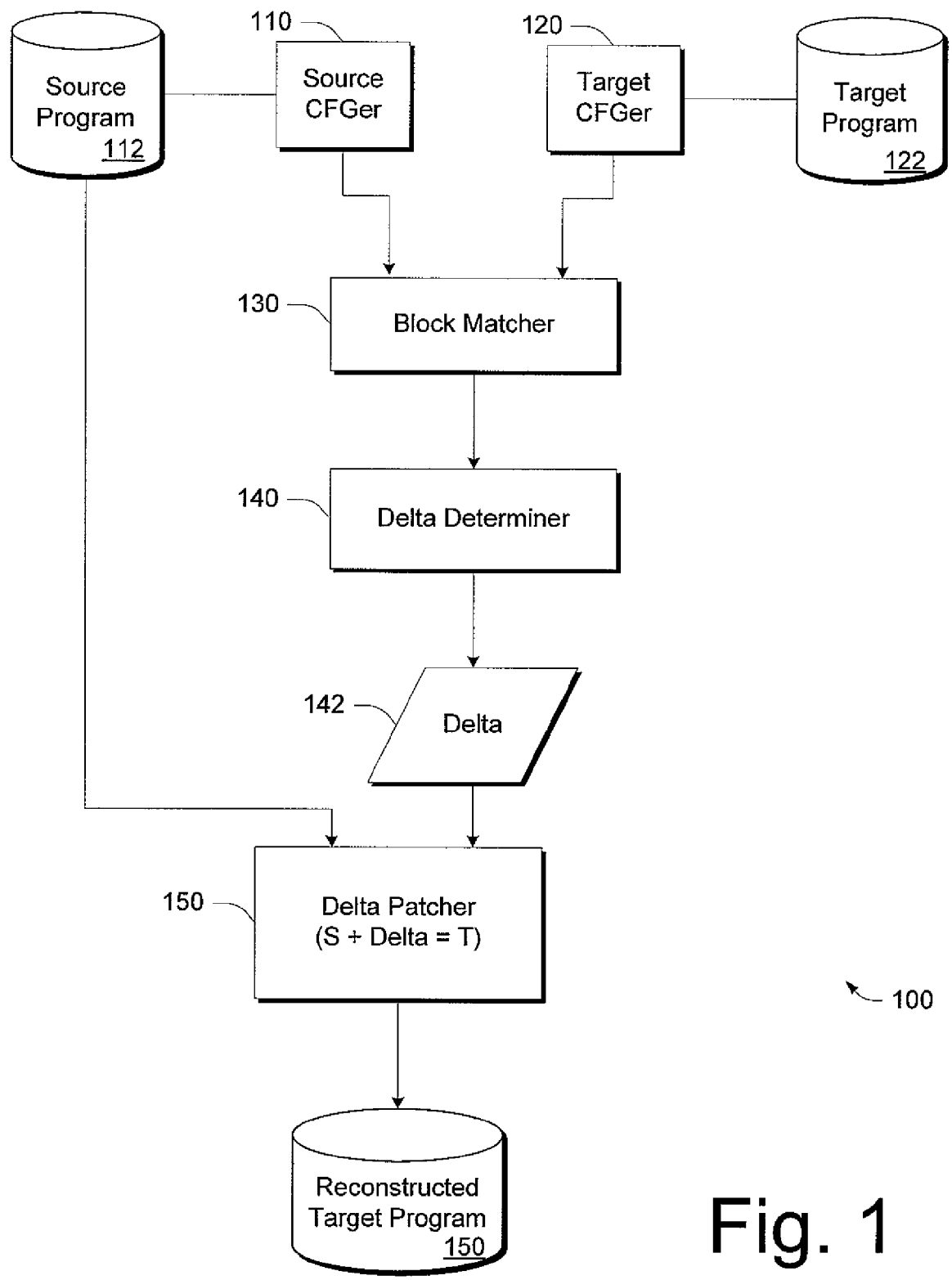
FIG. 1 is a schematic block diagram showing an embodiment of a minimum is delta generator for program binaries.

An exemplary implementation of a minimum delta generator for program binaries may be referred to as an exemplary "delta-generator." The one or more exemplary implementations described herein may be implemented (whole or in part) by a delta-generator system 100 of FIG. 1 and/or by a computing environment like that shown in FIG. 9.

To promote efficiency and speed, an exemplary delta-generator finds the minimum differences between the binary source and target programs and uses that to modify the source program. However, accuracy is not compromised for such efficiency and speed.

To accomplish this, the exemplary delta-generator compares the binary fragments of the source and target programs. It identifies those fragments that are the same (i.e., unchanged) between them. Necessarily, this also identifies those fragments that are different (i.e., changed) between them. The changed fragments are included in a delta. The exemplary delta-generator patches the source with the delta to transform the source into the target program.

High-Level Description of Delta-Generator System

FIG. 1 illustrates the delta-generator system 100. It shows a binary source program 112 and a binary target program 122. The delta-generator system 100 reconstructs the target program 122 from the source program 112 and a delta ($\Delta$) 142. Presumably, the target and source programs are different versions of the same program, so that at least some portions of their code are common. For example, the target program may be a newer version of the source program.

A source CFGer 110 produces a Control Flow Graph (CFG) of the source program 112. CFGs are discussed in more detail below in the "Terminology" section. Likewise, a target CFGer 120 produces a CFG of the target program 122. Of course, these two CFGers 110 and 120 may be a common CFGer.

FIG. 1 shows a block matcher 130 that receives the source and target CFGs as input and compares them. It matches binary fragments found in both the source and target CFG.

The delta generator 140 identifies the remaining (i.e., unmatched) fragments in the target CFG that were not matched as the delta ($\Delta$) fragments. Collectively, the block matcher 140 and the delta generator 150 it identify binary fragments in the target CFG that are matched in the source CFG or those that are unmatched in the source CFG.

In addition, the $\Delta$-determiner 140 also determines how to edit the source CFG to merge the $\Delta$ therein. These "edits" are part of the $\Delta$ 142, which is the result of the $\Delta$-determiner 140.

A $\Delta$-patcher 150 patches the source program at the binary level. The source program 112 is combined with the $\Delta$ 142 to reconstruct the target program 150. The reconstructed target program 150 is identical to target program 122. It is identical because the intended result is an identical copy of the target program 122. Since this delta-generator system 100 introduces no inaccuracies by its efficient patching of the source program, the copy will be identical.

Figure 2:
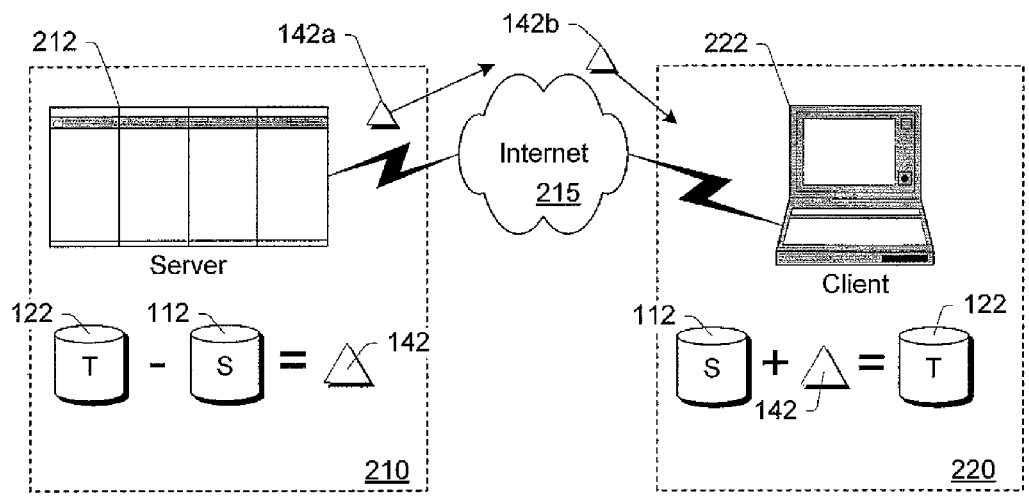
FIG. 2 is a schematic block diagram showing another embodiment of a minimum delta generator for program binaries.

FIG. 2 schematically illustrates a sample application scenario for the exemplary implementation of a minimum delta generator for program binaries. FIG. 2 shows a server side 210 and a client side 220 linked via a network connection 215, such as the Internet. The server side 210 includes a server 212 having a copy of the binary source program (S) 112 and a copy of the binary target program (T) 122. The client side 220 includes a client 222 having only a copy of the binary source program (S) 112. Initially, it does not have a copy of the target program (T) 122 or delta ($\Delta$) 142.

The server 212 at the server side 210 produces the $\Delta$ 142, in accordance with implementations described herein. It transmits such $\Delta$ to the client 222 at the client side 220. Representations 142a and 142b (and their arrows) indicates the $\Delta$ being transmitted from the server to the client.

The client patches S112 with the newly arrived $\Delta$142 to reconstruct T 122. Thus, with an implementation of an exemplary delta-generator, a minimum sized delta is transmitted over a presumably limited bandwidth network 215 for a client to patch S to accurately reconstruct T.

Terminology

An example of a program binary (or binary program) is binary manifestation of program module (e.g., software). It does not include the source code for a program module.

A "basic block" (or simply a "block") is a sequence of instructions that has a single entry point (only the first instruction can be reached from outside) and has one exit point, at the last instruction. Thus, there is sequential control flow inside a basic block. A basic block is an example of a fragment. Specifically, it is an example of a code-fragment. A basic block may be called a "code block."

A Control Flow Graph (CFG) is an abstraction of a program. It is a directed graph where the nodes are the basic blocks in the program, and the edges (often visually indicated by arrows) represent all possible control flow between blocks. FIGS. 3A-5 include CFGs.

Contiguous areas of static data in a program are called "data blocks" and they also form nodes in the CFG. A data block is an example of a fragment. Specifically, it is an example of a data-fragment.

Data blocks have static data (called the "raw" data) and they may have pointers to other parts of the program. These pointers could be, for example, virtual table entries of an object. Such pointers are relocatable data, and are thus different from other static data in a data block.

In a CFG, pointers in data blocks are represented by directed edges from the data block to the target blocks. In addition, address operands in the instructions in a code block are represented as edges from the code block to the block at the corresponding address.

The content of a data block includes its raw data, but it excludes the pointers in the block. Likewise, the content of a code block includes its sequence of instructions, but it excludes the address operands. The contents of the basic blocks in a CFG, along with its edges, fully specify the program. Given any block v in a CFG P, its parents are the set $\{x|x \rightarrow v$ is an edge in P$\}$, and its children are the set $\{x|v \rightarrow x$ is an edge in P$\}$.

The CFG described herein contains complete information about the layout of the program. Corresponding to the functions in the binary, there are procedures in the CFG—each procedure is the subgraph induced by the basic blocks of a single function. The layout of the function (i.e., the organization of the basic blocks in the program's address space) is captured by a linked list of the all the blocks of the corresponding procedure, such that a traversal of the list, from head to tail, exactly describes the order of the basic blocks in the function's layout.

A tool V creates the CFG described herein for any given program binary. Moreover, V may provide an interface (to the CFG) that allows a large class of modifications to be made to the program. These modifications include, but are not restricted to, addition and deletion of basic blocks, modification of their contents, and changes in the edges.

Those who are of ordinary skill in the art understand how to implement and use a tool V as described herein In addition, the incorporated-by-reference patent applications describe components that may be used to implement a tool like tool V. Moreover, the following publications provide a general background on CFG methodologies that the tool V may use: Aho, Hoperoft, Ulman: "Principles of Compiler Design" and 2) A. Aho, R. Sethi, J. Ullman, "Compilers, Principles, Techniques, and Tools" (1986).

In describing the one or more examples of implementations of the minimum delta generator for program binaries, a source (S) binary of a program and a target (T) binary of a program are discussed. The relationship of T and S may be described mathematically as:

Diff(S,T)=Δ; and

Patch(S, Δ)= T

Or in other words as:

The difference between S and T is delta; and

When S is patched with delta, it is T.

As described herein, the exemplary implementations fully minimize Δ while maintaining the ability to achieve complete accuracy in patching S to reconstruct T. Herein, with regard to patching, "complete accuracy" (and "substantially identical" or similar terminology) allows for insubstantial differences between the original T and the reconstructed T.

Matching

A prerequisite for detecting changes between binary programs (such as S and T) is the ability to detect identity of binary fragments. In other words, before a program module can be patched, one needs to determine which fragments have not been changed across the two binary programs. For example, one may detect the identity of a fragment in a program module by finding the same unchanged fragment in another program module (presumably an earlier or later version of the same module).

SIMPLE EXAMPLE

Figure 3A:
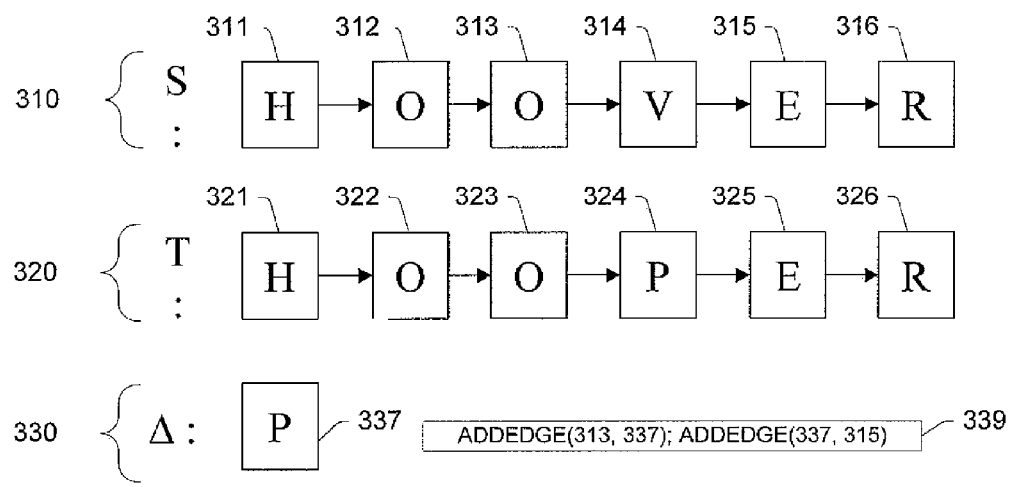
FIGS. 3A-C are illustrations of a simplified application of an implementation of a minimum delta generator for program binaries.
Figure 3B:
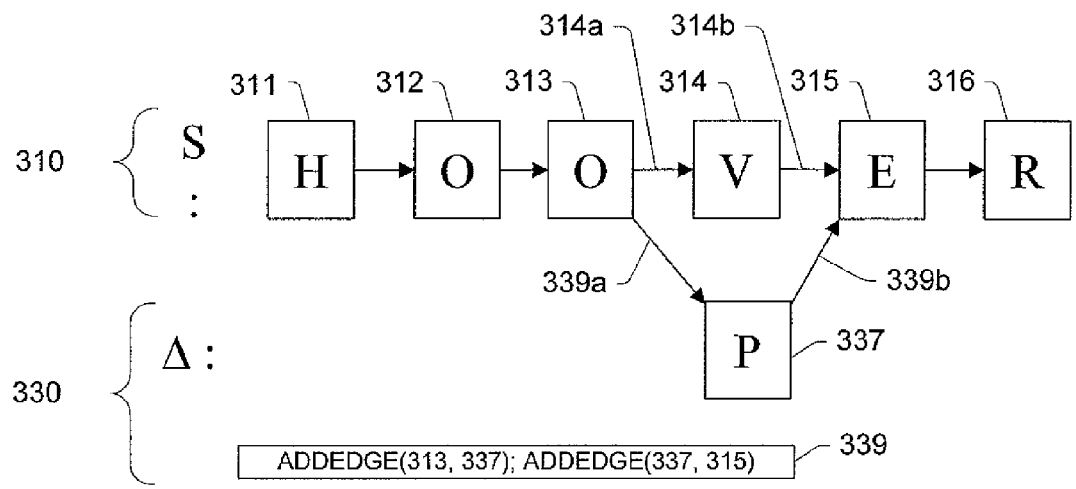
Figure 3C:
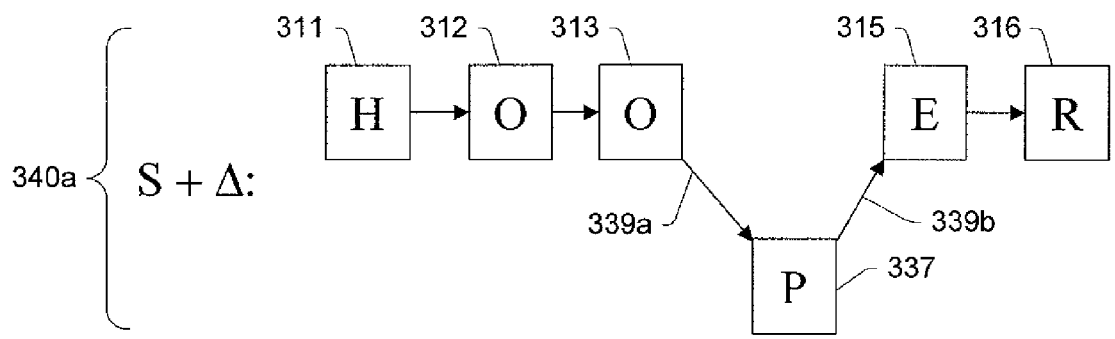
Figure 3C:
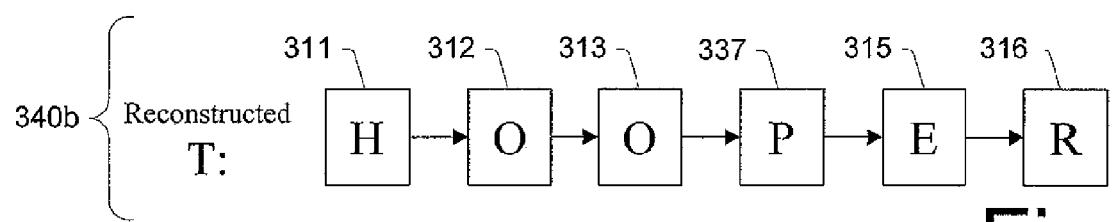

FIGS. 3A-3C illustrate a simple example of a methodological implementation of the exemplary delta-generator. In this example, the initial goal is to compute a Δ 330 for the input lists source (S) 310 and target (T) 320.

FIG. 3A shows source 310 and it includes six nodes, 311-316; and the contents of those nodes are H, O, O, V, E, R, respectively. Target 320 includes six nodes, 321-326; and contents of those nodes are H, O, O, P, E, R, respectively. Compared to the source 310, the target 320 is largely unchanged. The difference is node 314 (containing "V"), which is missing in the target but is replaced by node 324 (containing "P")

The exemplary delta-generator matches nodes that have not changed. Based on content and relative positioning, each node is matched (i.e., identified) except for the nodes 314 and 324. For example, node 311 and 321 match because their content (specifically, "H") and relative position are identical. Likewise, nodes 312 and 312 match, nodes 313 and 313, nodes 315 and 315, and nodes 316 and 316.

As shown in FIG. 3A, the delta 330 includes the content ("P") of node 324 as the content of node 337. The delta 330 also includes "edits" that specify how the new node is patched into the source. Specifically, delta 330 specifies "ADDEDGE (313, 337); ADDEDGE(337, 315)" within edit-box 339.

FIG. 3B shows that there are two edges to be added to source 310 after inserting the new node 337. Thus, the delta contains the edit operations ADDEDGE(313, 337), which translates to adding an edge 339a from the node 313 in the source 310 to the new node 337, and ADDEDGE(337, 315), which specifies the addition of link 339b from node 337 to node 315 in the source.

FIG. 3C illustrates a combination of the source and the delta at 340a. The addition of the delta (new node 337 and the two new edges (339a and 339b) ) transforms the source to an exact copy of list target 320. That exact copy of the target may be called a reconstructed target 340b.

Comparing FIGS. 3B and 3C, one notices the deletion of edge 314a between nodes 313 and 314 of the source and the deletion of edge 314b between nodes 314 and 315 of the source. This deletion is implicit by the addition of edges 339a and 339b.

Finding Matching Blocks

A good matching of blocks is one that minimizes the number of edit operations. If two blocks are matched based on content similarity alone, there might not be a good match. This is because there are usually multiple blocks in the source as well as target with identical content, differing only in their location in the respective graphs. For example, consider the subgraphs shown in FIG. 4.

Figure 4:
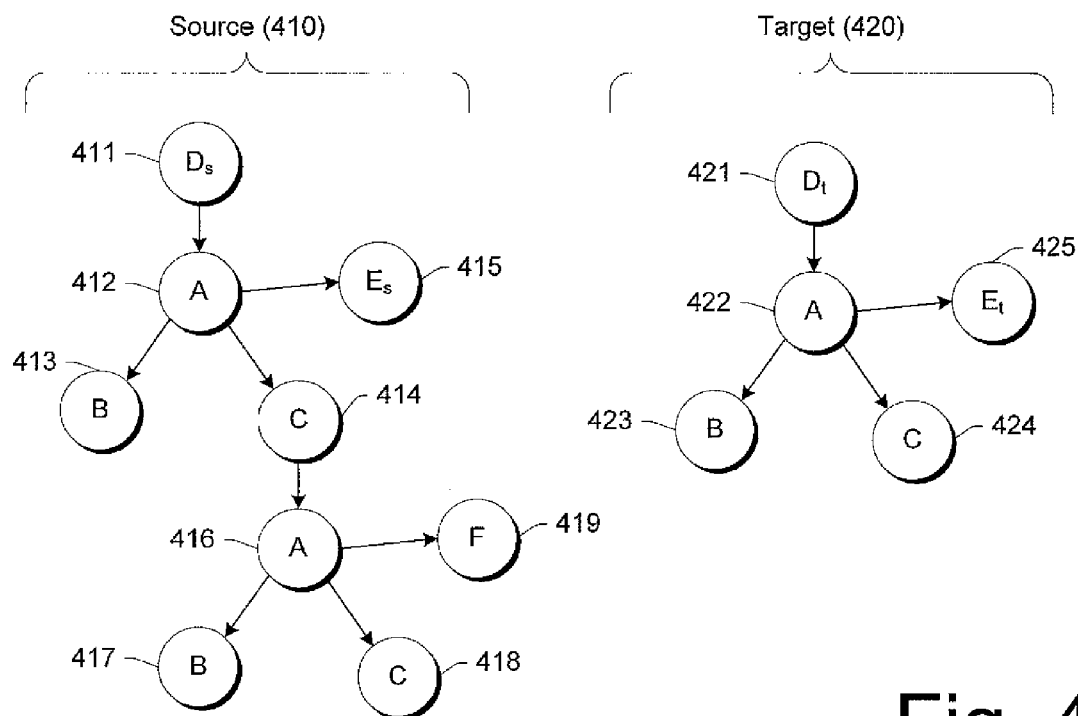
FIGS. 4 and 5 are illustrations of applications of implementations of a minimum delta generator for program binaries.

FIG. 4 shows subgraphs of source 410 and target 420. In terms of content, assume, for this example, that all the blocks in each of the following groups are identical: (412, 416, 422), (413, 417, 423), (414, 418, 424), (411, 421), (415, 425). Also, assume, for this example, that two blocks can be matched only if they are identical in content. If block 422 is matched with block 412 (which both contain "A"), then the best matching of the other blocks is block 411 ($D_s$) with block 421 ($D_t$);

block 415 ($E_s$) with block 425 ($E_t$);

block 413 with block 423 (which both contain "B"); and block 414 with block 424 (which both contain "C").

In this case, no edit operations are needed, since the local edge structure is preserved under this matching. On the other hand, if block 422 is matched with block 416 (which both contain "A"), the best matching of the other blocks is block 411 ($D_s$) with block 421 ($D_t$);

block 415 ($E_s$) with block 425 ($E_t$);

block 417 with block 423 (which both contain "B"); and block 418 with block 424 (which both contain "C").

The edit operations are Delete(411, 412), Add(422, 416), Delete(416, 419), Add(416, 415). Herein, Delete(a, b) means "delete the edge from node a to node b." Similarly, Add(a, b) means "add an edge from node a to node b."

The above examples are based upon content alone. These examples do not consider the blocks surrounding each block. Those surrounding blocks may be called the block's neighborhood or local neighborhood. These examples illustrate that the conventional matching approaches that are based upon content alone do not produce a good matching of blocks. It may even produce incorrect matching.

Consequently, the exemplary delta-generator considers neighborhoods of blocks while matching them.

Neighborhood Consideration

The exemplary delta-generator matches blocks based on their content and neighborhood. In fact, it makes several passes of the source and target CFGs, considering neighborhoods of decreasing sizes in each pass. Matching based on larger neighborhood sizes first is desirable—it produces matches that are more accurate. In a final pass, blocks are matched based on their content alone, after matching based on neighborhood has been examined. Although not a requirement, matching content last is advantageous because the overhead of recording an unmatched block is usually greater than the size of the edit operations required after it has been matched with any arbitrary block that has identical content.

To detect identical content of blocks, begin by obtaining is the sequence of instruction opcodes for code blocks and the raw, non-relocatable data for data blocks. As mentioned earlier, address operands are not considered part of content, because addresses usually change even though the referred blocks remain same. This problem is handled by considering address operands as edges in the CFG.

Register operands may be tricky to handle. Addition or deletion of some blocks may change the register allocation in some other nearby regions of the CFG, even though no change was made in these regions. Such operands are matched modulo a possible register-renaming, using register flow analysis of each graph. Since offsets of stack variables usually change because of changes in the local variable declarations, they present a problem. To address this problem, the exemplary delta-generator matches blocks even if certain immediate operands is have changed. In each of the above cases, when the sequence of operand types remains same, the content of code blocks is considered unchanged.

An i-neighborhood (i.e., local neighborhood) of a node v in a CFG P is the set of blocks that are at distance $\leq i$ from v in the undirected graph corresponding to P. Thus, for example, a 0-neighborhood is the set $\{v\}$ and a 1-neighborhood is v and its parents and children. The exemplary delta-generator computes, while attempting to find a match for a block, its d-neighborhood, for different values of d. Let a child edge for block v be an edge from v to one of its children, and a parent edge be an edge from a parent of v to v.

The exemplary delta-generator computes the i-neighborhood of v doing a breadth first traversal of the CFG, starting from the node v. It traverses child edges as well as parent edges (in the reverse direction) of blocks until it is at a distance greater than i from v. Alternatively, the exemplary delta-generator may ignore all parent edges, and traverses only child edges to compute the neighborhood.

For instance, consider the first block v in a procedure f in S that is called from three different blocks, $b_1$, $b_2$ and $b_3$. Suppose all these blocks, as well as the procedure f remain unchanged in T, but an extra call is added to f from the block $b_4$. The i-neighborhood (for $i \geq 1$) of v changes because of this extra call, and thus, v may remain unmatched because of it.

However, assume, for this example, that f itself did not undergo any changes, and hence, it might be advantageous to ignore the parents of v while computing its neighborhood. At times, the neighborhood may exclude any blocks that are in a different procedure.

In general, the larger the neighborhood size considered, the more accurate is the match, in terms of resolving ambiguities in matching candidates. However, it leads to fewer matches, which is undesirable. Hence, The exemplary delta-generator uses small neighborhood sizes (typically three or less), along with a longer random component, which is obtained by doing a "random walk" that is described later. This "random walk" heuristic has been empirically observed to perform well.

One example of a "random walk" is illustrated by the following: Suppose a person has to do a random walk on a straight road with several bus-stations A,B . . . N (in that order) on it. The person starts at A (one end of the road). Since this person can only go to the right, the person must go right—to B. Now, at B, there are two options—go left (to A) or right (to C). In the uniform random walk model, an unbiased coin is tossed and the person decides to go one way if its heads and the other if its tails. If the person keeps doing this at every station she reaches, then the person has performed a random walk.

The same idea can easily be extended to a general graph instead of a straight line. Here is heuristic based upon the above illustration of "random walk". Let R be the undirected graph whose vertices are the nodes of the CFG and which has an edge on a vertex pair if and only if the corresponding vertex pair in the CFG has a (directed) control flow edge, in either direction. Clearly, R is a graph with maximum degree three. It starts at the original node w, and at any node x, takes one of the dx edges with uniform probability. (dx is the degree of x). It aborts when it encounters a procedure boundary (call or branch to another procedure) or when the path length crosses a pre-determined limit.

Consider a block b that does not match any other block in content. Such a block, if included in the neighborhood of any block v, may prevent v from being matched, since in order for v to be matched to some block, its entire neighborhood has to be matched. The block b is called a "bad" node or an outlier. Before performing the matching, such outliers may be filtered out of the neighborhood of all their neighbors.

The exemplary delta-generator detects matches in several passes of the CFGs, based on progressively relaxing criteria. Preliminarily, the exemplary delta-generator matches the procedures of S and T, based on a preliminary estimate of the number of matching blocks. Examples of procedures are routines and sub-routines of a binary program.

This preliminary matching is performed at a global level (i.e., blocks are matched irrespective of the procedures in which they are located). Subsequently, blocks are matched only if they belong to matching procedures. Such matching may also be called local matching. The procedure match information is also used to examine targets of call instructions to detect if two different calls target the same function (which may have been renamed or whose first blocks might be different).

During a matching pass, the current matching criteria are used to compute short hash values of each node. The hash value of a block v is computed as follows:
- Each block in its d-neighborhood (for some suitable value of d) is hashed based on its content to produce a label for itself;
- All these labels are concatenated and the resulting string is hashed again to produce a single label for v, which is called the "d-label" of the block.

The nodes in each graph are sorted by these labels and blocks with identical labels and matching procedures are matched.

Some other heuristics are used to improve the matching. These heuristics are described herein, in particular in the "Additional Implementation Details" sections below. Assume, for instance, two blocks $c_1$ and $c_2$ are said to be corresponding children of blocks $b_1$ and $b_2$ if they are the $i^{th}$ children of $b_1$ and $b_2$ respectively, according to the above ordering, for some i. An example of a heuristic used to refine the matching is this: If matching blocks have corresponding children that match in their content labels (but maybe not in their d-labels), match those children.

At the end of this phase, the exemplary delta-generator has computed a partial matching of the blocks of S and T.

Computing Edits

Figure 5:
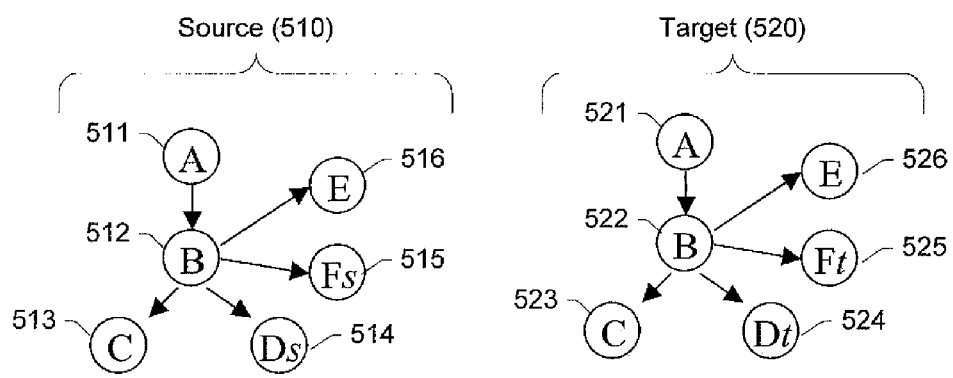

After the matching is complete, the next phase is computing the Δ. The toy example of FIGS. 3A-C gave a simple illustration of computing Δ. FIG. 5 illustrates an example that shows how the matching computed above may be used in creating the Δ for the case of graphs (i.e., CFGs).

FIG. 5 shows subgraphs of source 510 and target 520. Suppose the matching phase has matched these block pairs: 511 and 521 ("A"), 512 and 522 ("B"), 513 and 523 ("C"), and 516 and 526 ("E"). The unmatched blocks in the target subgraph 520 are block 525 ($F_t$) and block 524 ($D_t$). If Δ contains the contents of block 525 ($F_t$) and block 524 ($D_t$), and the edit operations Add(512, 525) and Add (512, 524), the target subgraph 520 can be reconstructed from the source subgraph 510.

The edit operations Delete(512, 514) and Delete(512, 515) need not be explicitly included in the Δ. They are implicitly included. Those of ordinary skilled in the art understand that the implicit edits may be expressly included in the Δ without departing from the spirit and the scope of the claimed embodiments. However, the implicit edits are not included in the Δ of the exemplary implementations described herein because they unnecessarily increase the size of the Δ.

The exemplary delta-generator, therefore, outputs (at some point) the contents of the unmatched blocks in the target, and the edges that need to be added, and that comprises the Δ.

Methodological Implementation of the Exemplary Delta-Generator

Figure 6:
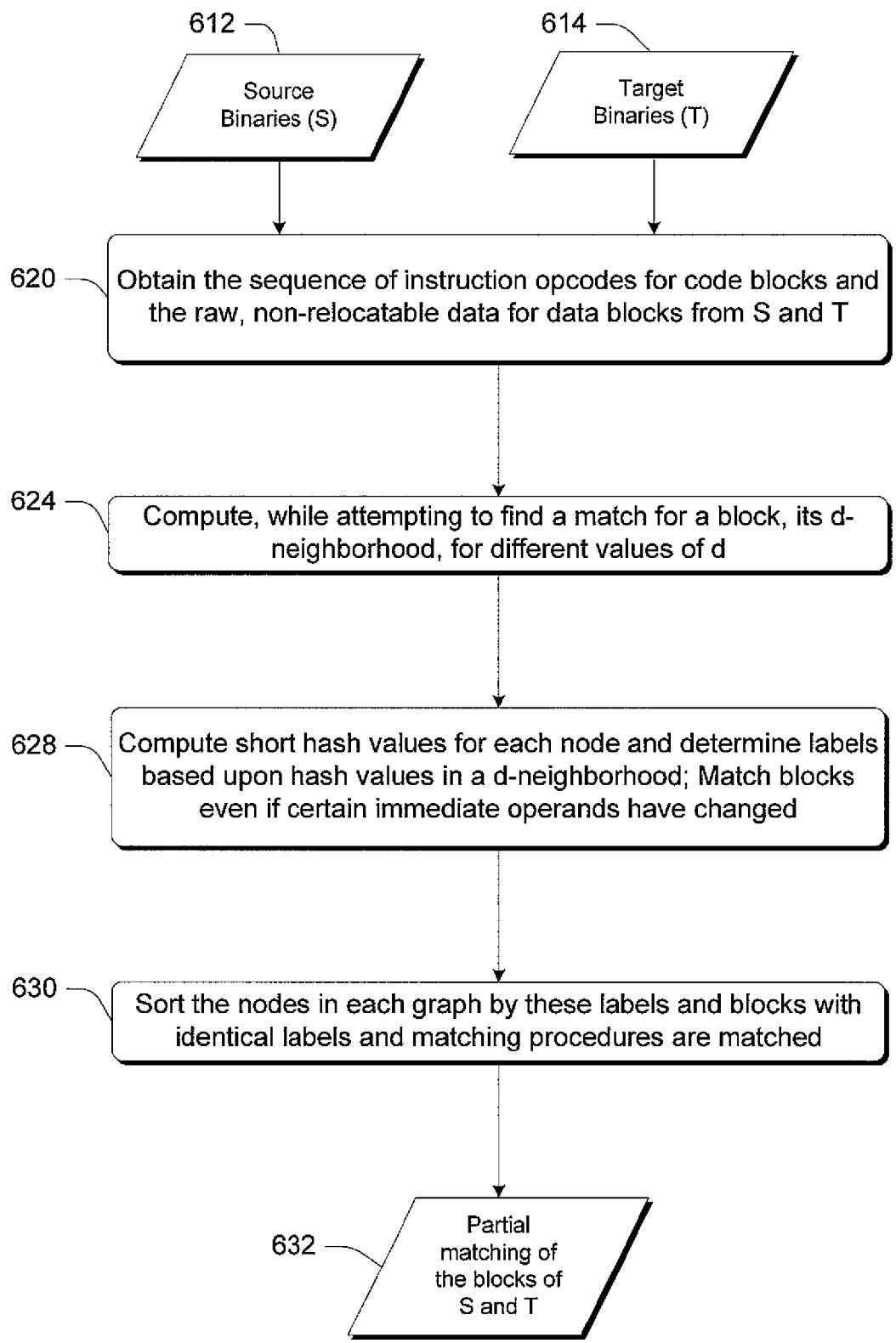
FIG. 6 is a flow diagram showing a methodological implementation of a minimum delta generator for program binaries.
Figure 7:
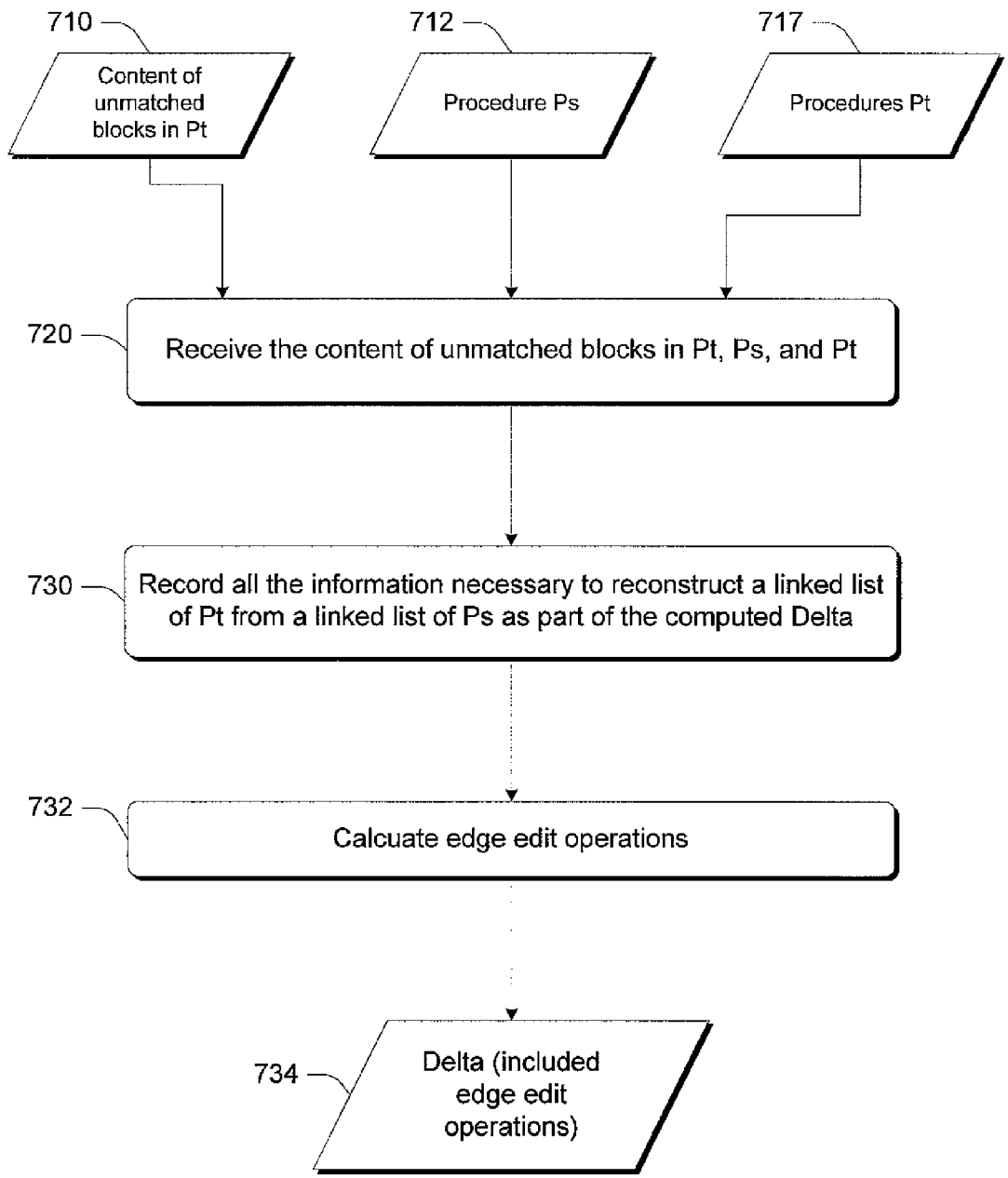
FIG. 7 is a flow diagram showing another methodological implementation of a minimum delta generator for program binaries.

FIGS. 6 and 7 shows methodological implementations of the exemplary delta-generator performed by the delta-generator system 100 (or some portion thereof). These methodological implementations may be performed in software, hardware, or a combination thereof.

FIG. 6 primarily shows the "matching" phase of a methodological implementation of the exemplary delta-generator. FIG. 7 primarily shows the "edit" phase of a methodological implementation of the exemplary delta-generator. The "edit" phase follows the "matching" phase. The result of the "edit" phase is the delta.

FIG. 6 shows, at 620, the exemplary delta-generator obtaining the sequence of instruction opcodes for code blocks and the raw, non-relocatable data for data blocks. Such blocks being blocks of procedures from source program binary (S) 612 and procedures from target program binary (T) 614.

At 624, the exemplary delta-generator computes, while attempting to find a match for a block, its d-neighborhood, for different values of d. In addition, the d-neighborhood is computed by breadth first traversal.

At 628, short hash values are computed for each node. In addition, the exemplary delta-generator determines labels for nodes based upon the hash values in their d-neighborhood (i.e., local neighborhood). Also at 628, the exemplary delta-generator matches blocks even if certain immediate operands have changed. At 630, the nodes in each graph are sorted by these labels, and blocks with identical labels and matching procedures are matched. At the end of this phase at 632, the exemplary delta-generator has computed a partial matching of the blocks of S and T. It also computes the converse, which are the unmatched blocks.

More details about the "matching" phase of this methodological implementation of the delta-generator are provided below in the "Additional Details" section.

FIG. 7 shows, at 720, the exemplary delta-generator receives the content 710 of unmatched blocks in $P_t$ (i.e., a procedure from target program binary), which is part of the output from the methodological implementation of FIG. 6. The content of a block excludes all edge information. Thus, if an unmatched block v whose content is being recorded has address operands (for code blocks) or pointers (for data blocks), then such operands or pointers are replaced by "dummy" addresses that indicate that they have to be corrected using the edge edit information.

$P_s$ and $P_t$ represent all pairs of procedures (in S and T respectively) that are matched by the matching phase. For any pair, $P_s$ is the procedure from the source and $P_t$ is the matching procedure from T. The exemplary delta-generator receives a pair of procedure $P_s$ 712 in source program binary (S) and procedure $P_t$ 714 in source program binary (T).

At 730, all the information necessary to reconstruct a linked list of $P_t$ from a linked list of $P_s$ is recorded as part of the computed Δ. The layout (i.e., arrangement of blocks) of each procedure in the program's address space is captured by a linked list of blocks, such that a sequential traversal of this list, from head to tail, can exactly describe the layout of the procedure. The first task in reconstructing $P_t$ from $P_s$ would be to reconstruct the linked list of $P_t$ from the linked list of $P_s$. Hence, all the information necessary to reconstruct one linked list from the other is recorded as part of the computed Δ.

At 732, edge edit operations are calculated. An edge edit operation, as mentioned above, is an explicit addition of an edge (rather than an implicit deletion). Each edge can be fully specified by its source and target. Within the context of edits, the term "source" refers to the exact operand (for code blocks) or relocatable word (for data blocks) that this edge represents. In addition, within the context of edits, the word "target" on the other hand represents the block whose address this operand or relocatable word refers to. The exemplary delta-generator records an edited edge (an edge that has been added or deleted) by recording unique identifiers for the source and the target in separate lists.

The delta for a given procedure ($P_s$) in the source is outputted at 734. Such delta includes the unmatched blocks in $P_t$ and the edge edit operations calculated at 732.

The above methodological implementation of the "edit" phase of the exemplary delta-generator records sufficient information to reconstruct the target program binary up to some minor changes in register names, immediate values, and instruction opcodes. These changed register names, immediate values, and opcodes are recorded in separate lists.

Additional Implementation Details

The matching phase of the exemplary implementation makes several passes of the CFGs, each of which is described in more detail below.

Multiple-Pass in the Matching Phase

Each pass in the matching phase uses different criteria for comparing blocks in S and P, and it does so by computing hash values or labels for each block. In the exemplary implementation, two exemplary sub-processes are employed and called in several passes. Herein, they are called ComputeLabel and ComputeDLabel.

ComputeLabel: Computes the hash value of the content of a block. This is also called the content label of the block. It uses a standard hash to calculate the hash value. An example of such a standard hash is MD5, which produces 16 byte strings as the hash of a given string of bytes.

This exemplary sub-process, called ComputeLabel, is parameterized to allow different matching criteria, and the Boolean parameters are: Immediate, RegisterChain, OpcodeString and ProcId. Immediate indicates whether the immediate operands in a code block are to be used in hashing. Similarly, RegisterChain specifies whether register renaming is to be used, and OpcodeString indicates whether an opcode is represented by its precise name or its group identifier ("group id").

Using group ids for similar opcodes catches small changes in instructions so that do not affect the functionality. For example, consider a portion of S where the only change is that an instruction "jge eax, 10" has changed to "jle eax, 10". This could happen, for instance, if a bug was discovered where the direction of the inequality was incorrect. In such cases, both 'jge' and 'jle' can be represented by their opcode group 'branch' and the corresponding blocks might be matched as a result.

The fourth parameter, ProcId indicates whether procedure matching has already been done, in which case procedures have unique identifiers that match for matching procedures. If this parameter is set, function call targets are represented by their procedure identifiers. An example of the pseudo-code is for the sub-process ComputeLabel is:

```
ComputeLabel (Block, Immediate, RegisterChain, OpcodeString, ProcId)
If (Block is a data block)
    Iterate through each Relocatable word in Block, and clear it
to zero.
    Hash the resulting data buffer and return the hash value.
Endif
If (Block is a code block)
    Create a buffer that may hold the data to be hashed.
    For each instruction except the last :
        If (OpcodeString is true)
            Record the opcode string in the buffer
        Else
            Record the opcode group in the buffer
        End
        For each operand in the instruction
            Case OperandType
                Pointer: Record the constant string "Block".
                Register: If (RegisterChain is true)
                    Record the register flow id and
register flow id is defined (computed earlier)
                Else
                    Record the register name.
                Endif
                Immediate: If (Immediate is true)
                    Record the immediate constant
                Endif
            End
        End
    End
    For the last instruction :
        If (Opcodestring is true)
            Record the opcode string in the buffer
        Else
            Record the opcode group in the buffer
        End
        If (ProcId is true)
            Compute the target block of the instruction.
            If the target is in a different procedure
                Record the procedure id of the target procedure
            Endif
        Endif
    End
    Hash the buffer and return the hash value.
Endif
End ComputeLabel
```

ComputeDLabel: Computes the hash value based on content as well as neighborhood. This examines the entire already-computed neighborhood (including the root node) and concatenates their content labels. It then returns the hash value of this concatenated list.

The implementation uses a standard hash to calculate the hash value. An example of such a standard hash is MD5, which produces 16 byte strings as the hash of a given string of bytes.

Figure 8:
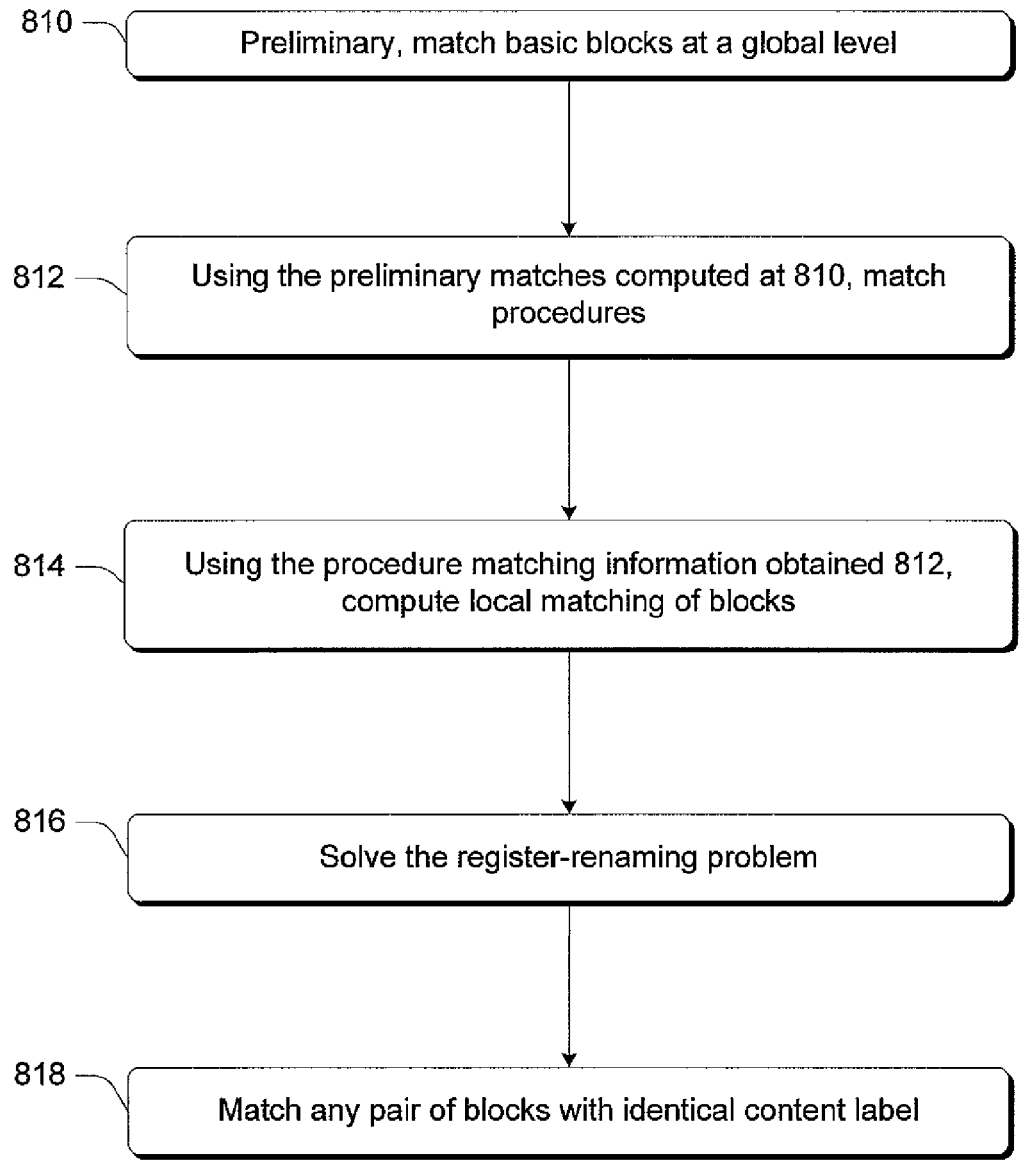
FIG. 8 is a flow diagram showing still another methodological implementation of a minimum delta generator for program binaries.

Additional Details about the Methodological Implementation of the Matching Phase of the Exemplar Delta-Generator FIG. 8 illustrates the broad methodological implementation of the matching phase of the exemplary delta-generator. This broad methodological implementation may be performed by the delta-generator system 100 (or some portion thereof). This broad methodological implementation may be performed in software, hardware, or a combination thereof.

Additional details of this broad methodological implementation are described below:

Task 1 (810 of FIG. 8): Preliminary Matching of Basic Blocks

This task (810 of FIG. 8) matches basic blocks at a global level.

For each block in S as well as T, the exemplary delta-generator calls ComputeLabel and assigns it a content label. Each of the four parameters to ComputeLabel is false at this stage.

The exemplary delta-generator matches blocks of S with blocks of T based on the computed labels. Duplicate blocks in S (i.e., blocks having the same hash value) are matched to any of the blocks in T that have the same label. Whenever two blocks are matched, each of them is assigned a unique MatchId for reference later. Blocks that are unmatched after this task are designated as outliers.

The exemplary delta-generator computes d-neighborhoods (d=2) for each block, by doing a breadth-first traversal that starts at this block. The traversal visits parents of a block if it has no children.

The exemplary delta-generator filters out bad nodes computed above from all d-neighborhoods.

The exemplary delta-generator calls ComputeDLabel for each block and assigns it a d-label, which is the value returned from the call.

The exemplary delta-generator matches blocks of S and T that have identical d-labels.

Any two matching blocks, $b_1$ and $b_2$ must have the same number of out-edges. Let these out-edges be ordered by their location in the blocks. Two blocks $c_1$ and $c_2$ are said to be corresponding children of blocks $b_1$ and $b_2$ if they are the $i^{th}$ children of $b_1$ and $b_2$ respectively, according to the above ordering, for some i. The exemplary delta-generator refines the matches by using the following rule: If matching blocks have corresponding children that match in their content labels (but maybe not in their d-labels), match those children.

Task 2 (812 of FIG. 8): Matching Procedures

This task (812 of FIG. 8) uses the preliminary match computed above to match procedures.

The exemplary delta-generator iterates through each procedure $P_t$ in T, and computes, for each procedure $P_s$ in S, the number $m_{st}$ of blocks in $P_t$ that match blocks in $P_s$.

The exemplary delta-generator matchs procedure pairs based on their $m_{st}$ values. The $m_{st}$ values may also be called the procedure-matching-criteria. The technique for matching procedures using $m_{st}$ values is discussed below.

The exemplary delta-generator assigns the same unique identifiers to matching procedures. The exemplary delta-generator assigns unique identifiers to all other procedures also.

An exemplary delta-generator for matching procedures meets this condition: Given any $P_s$ and any two $P_{t1}$ and $P_{t2}$, if $P_s$ is matched to $P_{t1}$ then either $M_{st1} \geq m_{st2}$ or $P_{t2}$ is matched to $P_S$ such that $m_{st2} \geq m_{st2}$. The following technique satisfies the condition:

Create $(P_t, P_s, m_{st})$ triplets $\forall_{s,t}$ and sort them on $m_{st}$; and Iterate through the sorted list of triplets in the descending order. At any iteration, if $P_t$ and $P_s$ are both unmatched, match them.

Task 3 (814 of FIG. 8): Local Matching of Basic Blocks

This task (814 of FIG. 8) uses the procedure matching information obtained in the previous task to compute local matching of blocks (i.e., blocks are matched only between matching procedures).

Start with no blocks matched. For each block in S as well as T, the exemplary delta-generator calls ComputeLabel and assigns it a content label. The Immediate, Opcode-String and ProcId parameters are true when calling ComputeLabel.

The exemplary delta-generator matches blocks of S with blocks of T based on the computed content labels. Duplicate blocks in S (i.e., blocks having the same hash value, are matched to any of the blocks in T that have the same label). Whenever two blocks are matched, each of them is assigned a unique MatchId for reference later. If a block already has a previously assigned MatchId, reassign it. Blocks that are unmatched after this task are designated as outliers.

For d=3,2,1 the exemplary delta-generator does the following:

Computes d-neighborhood for each block, by doing a breadth-first traversal that starts at this block. The d-neighborhood has a random component also. The random component is a set of blocks that are encountered while performing a fixed length uniform random walk starting at the original node. The random walk looks only at real control flow edges and chooses one of them with uniform probability. It aborts when it encounters a procedure boundary (e.g., call or branch to another procedure).

Filters out the bad nodes computed above from all the d-neighborhoods.

Calls ComputeDLabel for each block and assign it a d-label.

Matches blocks of S and T that have identical d-labels. If two blocks in T match the same block in S, only one of them is actually matched. The tie may be broken arbitrarily.

Improves the matching by following the guideline: If matching blocks have corresponding children that match in their content labels (but maybe not in their d-labels), match those children.

At any stage, a block previously matched is not rematched or unmatched.

The exemplary delta-generator assigns each matching pair of blocks a unique MatchId, which is used as the content label for those two blocks thereafter Task 4 (816 of FIG. 8): Solving the Register Renaming Problem This task (816 of FIG. 8) solves the register-renaming problem (i.e., it detects matching blocks even in the face of a possible register renaming). The exemplary delta-generator computes all register flow chains in S and T, and assigns each of them an identifier. Matching blocks have their corresponding register flows assigned the same identifier.

The exemplary delta-generator calls ComputeLabel with RegisterChain true and assigns each block a content label.

The exemplary delta-generator matches unmatched blocks, based on these labels and their d-neighborhoods (d=2). The exemplary delta-generator repeats this task until no more matches are discovered. This is done because the new matching blocks may cause some more register chains to be assigned the same identifiers, and in turn lead to even more matches.

Below, the section titled "Solving the Register Renaming Problem" discusses this in more detail.

Task 5 (818 of FIG. 8): The Final Pass

In this last matching task (818 of FIG. 8), any pair of blocks with identical content label (computed in the previous tasks) is matched.

Solving the Register Renaming Problem

For each procedure, the exemplary delta-generator computes its use-def chains, def-use chains, and dominator information. A use-def chain is a list that starts with a register use and goes through all the definitions (defs) of that register that reach this use. Similarly, a def-use chain is a list that starts with a register def and goes through each use of the same register, reached by this def. A block d is called a dominator of another block b. b is reachable from d and any path to b from the entry point of the procedure must first pass through d. Typically, computing dominator information means computing all dominators of every block in the procedure.

For each basic block in each procedure, the exemplary delta-generator looks at all the register defs in the block, and assigns each of them an id, called the def id, which is unique for that block. The exemplary delta-generator looks at all the register uses in that block, and if any use has its only def in the same block, assigns the def identifier to this use. Thus at this stage, all defs and some uses have ids associated with them. There may be some register uses with undefined ids. ComputeLabel (defined above) when called with RegisterChain=true uses their names if the id is not defined.

The exemplary delta-generator calls ComputeLabel (with RegisterChain=true) for each unmatched block in S and T, and assigns the returned label to its content label. The exemplary delta-generator computes d-neighborhoods (d=2) for each unmatched block. The exemplary delta-generator calls ComputeDLabel to assign it a d-label, and matches S and T based on the newly computed d-labels.

For any pair of code blocks $(b_s, b_t)$ currently matched, the exemplary delta-generator does the following:

Iterates through corresponding (located at the same place) register defs in the two blocks.

Assigns a unique identifier (positive), unique for the entire procedure, to each of the two defs being examined currently.

These identifiers replace any previously assigned def identifiers that the defs may have. The fact that two defs match is recorded, and a single identifier is associated with both of them.

Next, the exemplary delta-generator matches register uses based on the newly assigned def identifiers. For both S and T, the exemplary delta-generator iterates through all the register uses in each basic block. For each such use, all the defs are examined that reach it and are not dominated by it. The exemplary delta-generator adds up their def identifiers and assign the sum to the current use's identifier. Consequently, each register operand, def or use, has an identifier associated with it. Matching blocks have matching identifiers associated with corresponding register operands. More specifically, two register operands, that have exactly matching defs, may also have matching identifiers even though the register names may be different.

If any new matches were discovered in the most recent execution of the exemplary delta-generator calling Compute-Label with RegisterChain=true (described above), the process loop back to there.

Additional Details about the Methodological Implementation of the Edit Phase of the Exemplary Delta-Generator The exemplary delta-generator creates a new dummy CFG, called bin, with a single procedure that may serve as a container for all the additional blocks of T. These blocks are, for example, maintained in the form of a linked list.

The exemplary delta-generator traverses each block in T, in sequence, and assigns consecutive identifiers (starting at zero) to each unmatched block. Also, the exemplary delta-generator dumps the unmatched blocks into bin, making sure that address operands in code blocks and pointers in data blocks are modified into 'dummy' addresses referring to the blocks containing those pointers.

The exemplary delta-generator traverses each block in S, in sequence, and assigns consecutive identifiers to each matching block. The same identifiers are assigned to matching blocks in T. The identifiers assigned in this and the previous task are called New_Node_Ids.

The exemplary delta-generator examines the matched blocks of the source graph. If a block x in S matches block y in T, check each of its outgoing edges. For each edge $x \rightarrow z_1$, there has to be a corresponding $y \rightarrow z_2$.

case i. $z_2$ matches $z_1$: do nothing.
case ii. $z_2$ matches $z_3 \neq z_2$: Record the link $x \rightarrow z_3$.
case iii. $z_2$ is unmatched: Record the link $x \rightarrow z_2$.

An edge is recorded as follows. Three lists, named TargetId, OperandIndex and SourceProcFirstBlock are created. If an edge x+y is to be recorded, the New_Node_Ids of y is inserted into TargetId. If this edge was the $i^{th}$ edge in the current procedure, i is pushed into the list OperandIndex. Finally, if any procedure $P_s$ in S has at least one edge being recorded, the New_Node_Id of its first block is pushed into SourceProcFirstBlock.

The exemplary delta-generator examines all the unmatched blocks in the target graph. The exemplary delta-generator looks at each of its outgoing edges $x \rightarrow y$. If y is also an unmatched block, the exemplary delta-generator creates an edge in bin going from x to y. If y matches z in the source graph, the exemplary delta-generator records the link x z by pushing the New_Node_Id of z into a list called TargetOperandTargets.

For each procedure $P_s$ in S that has a matching procedure $P_t$ in T, the exemplary delta-generator traverses the linked list of the blocks of $P_t$. At any point in the traversal, if $ptr_1$ and $ptr_2$ point to the current node and its next node in T, let $mptr_1$ and $mptr_2$ be their 'matching' pointers. If $ptr_1$ points to block x in T, its matching pointer $mptr_1$ points to its matching block in S if there is one, or to the copy of x that has been dumped in bin. At any stage in the traversal, if $mptr_1$ and $mptr_2$ point to nodes that are not adjacent (in that order) in the list, the edge $mptr_1 \rightarrow mptr_2$ is recorded. This is done by pushing the New_Node_Ids of their corresponding blocks into separate lists called LinkedListsLeft and LinkedListsRight. In addition, the New_Node_Id of the first block of $P_t$, along with the latter's size (in terms of number of blocks) and the number of recorded links in $P_t$ is recorded in a separate list called ProcedureInfo.

The exemplary delta-generator uses the edit information computed above, along with S to reconstruct T.

Alternatively, the exemplary delta-generator may detect the register names, immediate values, and instruction opcodes that differ between the original and reconstructed versions of T, and output these differences in a separate list called MinorDifferences.

All these lists, together with the bin comprises the computed Δ in an exemplary implementation of the delta-generator.

Delta Compression

The above sections sufficiently describe how to reconstruct, using the exemplary delta-generator, a copy of T, given S and Δ. Like what is shown in FIG. 2, the generated Δ may be transmitted from a server 212 to a client 222.

This Δ may be compressed to use the available bandwidth on network 215 more efficiently. Therefore, the exemplary delta-generator may format the patch in a way that it can be heavily compressed. The patch is split into several parts, each holding information of a different kind, so that each part can be compressed separately. This approach is based on the observation that different types of data (code vs. lists of integers, for example) may be best compressed by different compression algorithms (i.e., engines).

This approach may be combined with steps mentioned above in the "Additional Implementation Details" section. In the exemplary delta-generator, the "several parts" mentioned here are the several different lists that were mentioned in the Edits phase above and the dummy "bin" that was mentioned there. Each of these lists (and bin) are stored as a separate file in one implementation, and thus compressed separately. An example of a compression algorithm that may be used is LZW.

It is expected to work better for large executables (of the order of several hundred kilobytes) and our initial experiments show that for such large executables, The exemplary delta-generator produces, on the average, a smaller patch that any of the other available patching tools that we know of.

Examples of Applications for Exemplary Implementations

Among the possible examples of applications for implementations of the exemplary delta-generator is as a tool to send software upgrades or patches via media with bandwidth constraints. With software availability on the Internet becoming increasingly popular every day, such a patching tool may be beneficial to uses of software Another possible example of applications for implementations of the exemplary delta-generator is in the realm of anti-piracy of software. Using an implementation of the exemplary delta-generator, an anti-piracy tool may be able to detect similarity of programs. Another possible exemplary application could be in analysis of the nature of changes between different versions of software.

Exemplary Computing Environment

FIG. 9 illustrates an example of a suitable computing environment 920 on which an exemplary delta-generator are, for example, implemented.

Exemplary computing environment 920 is only one example of a suitable computing environment and is not intended to suggest any limitation as to the scope of use or functionality of an exemplary delta-generator. Neither should the computing environment 920 be interpreted as having any dependency or requirement relating to any one or combination of components illustrated in the exemplary computing environment 920.

The exemplary delta-generator is operational with numerous other general purpose or special purpose computing system environments or configurations. Examples of well known computing systems, environments, and/or configurations that are, for example, suitable for use with an exemplary delta-generator include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary delta-generator are, for example, described in the general context of computer-executable instructions, such as program modules, being executed by a computer. Generally, program modules include routines, programs, objects, components, data structures, etc. that perform particular tasks or implement particular abstract data types. An exemplary delta-generator may also be practiced in distributed computing environments where tasks are performed by remote processing devices that are linked through a communications network. In a distributed computing environment, program modules are, for example, located in both local and remote computer storage media including memory storage devices.

As shown in FIG. 9, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 930 typically includes a variety of computer readable media. Such media are, for example, any available media that is accessible by computer 930, and it includes both volatile and non-volatile media, removable and non-removable media.

In FIG. 9, the system memory includes computer readable media in the form of volatile memory, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 9 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules are, for example, stored on the hard disk, magnetic disk 948, optical disk 952, ROM 938, or RAM 940, including, by way of example, and not limitation, an operating system 958, one or more application programs 960, other program modules 962, and program data 964.

Each of such operating system 958, one or more application programs 960, other program modules 962, and program data 964 (or some combination thereof) may include an embodiment of an exemplary delta-generator. More specifically, each may include an embodiment of delta-generator system, comparator, edit-op determiner, and output sub-system.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through a user input interface 970 that is coupled to bus 936, but are, for example, connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 9 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 via network interface or adapter 986. When used in a WAN networking environment, the computer typically includes a modem 978 or other means for establishing communications over the WAN 979. The modem 978, which are, for example, internal or external, are, for example, connected to the system bus 936 via the user input interface 970 or other appropriate mechanism.

Depicted in FIG. 9, is a specific implementation of a WAN via the Internet. Computer 930 typically includes a modem 978 or other means for establishing communications over the Internet 980. Modem 978, which are, for example, internal or external, is connected to bus 936 via interface 970.

In a networked environment, program modules depicted relative to the personal computer 930, or portions thereof, are, for example, stored in a remote memory storage device. By way of example, and not limitation, FIG. 9 illustrates remote application programs 989 as residing on a memory device of remote computer 982. It will be appreciated that the network connections shown and described are exemplary and other means of establishing a communications link between the computers are, for example, used.

Exemplary Operating Environment

FIG. 9 illustrates an example of a suitable operating environment 920 in which an exemplary delta-generator may be implemented. Specifically, the exemplary delta-generator(s) described herein is implemented (wholly or in part) by any program module 960-962 and/or operating system 958 in FIG. 9 or a portion thereof.

The operating environment is only an example of a suitable operating environment and is not intended to suggest any limitation as to the scope or use of functionality of the exemplary delta-generator(s) described herein. Other well known computing systems, environments, and/or configurations that are suitable for use with an exemplary delta-generator include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer-Executable Instructions

An implementation of an exemplary delta-generator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary delta-generator may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the minimum delta generator for program binaries has been described in language specific to structural features and/or methodological steps, it is to be understood that the minimum delta generator for program binaries defined in the appended claims is not necessarily limited to the specific features or steps described. Rather, the specific features and steps are disclosed as preferred forms of implementing the claimed embodiments.

The invention claimed is:

1. A method for matching blocks between a first control flow graph (CFG) representation of a portion of a first program and a second CFG representation of a portion of a second program, the method comprising:

matching blocks, by one or more computing devices configured to match blocks between the first CFG representation of the portion of the first program and the second CFG representation of the portion of the second program, between the first and second CFG representations based upon the content of the blocks;

detecting outliers, by one or more computing devices, wherein outliers are blocks in the first CFG representation that do not match any block in the second CFG representation during the matching step;

computing a neighborhood, that may have a depth greater than 1, of each block in the first and second CFG representations by performing a breadth first traversal;

removing the outliers from each neighborhood.

2. A method as recited in claim 1 further comprising:

computing labels for each block in first and second CFG representations based upon content of a block;

for each neighborhood computed in the computing step, forming a "d-label" for each block in a neighborhood based upon labels of the blocks within the neighborhood;

attempting to match blocks between first and second CFG representations by comparing the d-labels of the blocks.

3. A computer-readable storage medium storing computer-executable instructions that, when executed by a computer, performs the method as recited in claim 1.

4. A method for matching procedures between a first control flow graph (CFG) representation of a portion of a first program and a second CFG representation of a portion of a second program, wherein a procedure comprises multiple blocks in a CFG representation, wherein each block of each procedure has its own defined sequence of executable instructions with a block's first instruction being its single entry point and its last instruction being its single exit point, the method comprising:

computing, by one or more computing devices configured to match procedures between the first CFG representation of the portion of the first program and the second CFG representation of the portion of the second program, a procedure-match-criterion for each procedure in the second CFG representation, where the procedure-match-criterion for a procedure in the second CFG representation represents the number of matching blocks between that procedure and a specified procedure in the first CFG representation;

matching, by one or more computing devices, procedures in the second CFG representation with the specified procedure in the first CFG representation based upon the procedure-match-criteria for the procedures in the second CFG representation;

attempting to match blocks in the procedure in the second CFG representation with blocks in the specified procedure in the first CFG representation.

5. A computer-readable storage medium storing computer-executable instructions that, when executed by a computer, performs the method as recited in claim 4.

6. A method for matching of blocks in a procedure of a first control flow graph (CFG) representation of a portion of a first program between an ostensibly matching procedure of a second CFG representation of a portion of a second program, the method comprising:

matching blocks, by one or more computing devices configured to match blocks between the procedure of the first CFG representation of the portion of the first program between the ostensibly matching procedure of the second CFG representation of the portion of the second program, between the first and second CFG representations based upon the content of the blocks;

computing, by the one or more computing devices, successively smaller neighborhoods of each block in the first and second CFG representations via breadth first traversals;

for each neighborhood computed in the computing step, forming a "d-label" for each block in a neighborhood based upon labels of the blocks within the neighborhood;

attempting to match blocks between first and second CFG representations by comparing the d-labels of the blocks.

* * * * *